United States Patent [19]

Akao

[11] Patent Number: 4,871,613
[45] Date of Patent: Oct. 3, 1989

[54] PACKAGING MATERIAL

[75] Inventor: Mutsuo Akao, Kanagawa, Japan

[73] Assignee: Fuji Photo Film Co., Ltd., Minami-Ashigara, Japan

[21] Appl. No.: 34,844

[22] Filed: Apr. 6, 1987

[30] Foreign Application Priority Data

Apr. 7, 1986 [JP] Japan .................................. 61-50918

[51] Int. Cl.⁴ .......................... B32B 27/00; B32B 5/16
[52] U.S. Cl. .................................... 428/328; 428/323;
428/349; 428/408; 428/411.1; 428/447;
428/461; 428/476.3; 428/483; 428/500;
428/516; 428/517
[58] Field of Search ............... 428/408, 328, 447, 461,
428/476.3, 483, 516, 517, 411.1, 349, 500, 323

[56] References Cited

U.S. PATENT DOCUMENTS

| | | |
|---|---|---|
| 4,147,291 | 4/1979 | Akao et al. . |
| 4,258,848 | 3/1981 | Akao et al. . |
| 4,331,725 | 5/1982 | Akao . |
| 4,337,285 | 6/1982 | Akao et al. . |
| 4,356,224 | 10/1982 | Akao et al. . |
| 4,359,499 | 11/1982 | Akao et al. . |
| 4,386,124 | 5/1983 | Akao . |
| 4,411,943 | 10/1983 | Akao . |
| 4,411,945 | 10/1983 | Akao et al. . |
| 4,436,809 | 3/1984 | Akao et al. . |
| 4,452,846 | 6/1984 | Akao ..................... 428/461 |
| 4,469,741 | 9/1984 | Akao . |
| 4,513,050 | 4/1985 | Akao ..................... 428/516 |
| 4,565,733 | 1/1986 | Akao . |
| 4,565,743 | 1/1986 | Akao . |
| 4,576,865 | 3/1986 | Akao ..................... 428/516 |
| 4,579,781 | 4/1986 | Akao . |
| 4,584,234 | 4/1986 | Hirose et al. . |
| 4,587,175 | 5/1986 | Akao . |
| 4,629,640 | 12/1986 | Akao . |
| 4,639,386 | 1/1987 | Akao . |
| 4,653,640 | 3/1987 | Akao . |
| 4,661,395 | 4/1987 | Akao . |
| 4,661,401 | 4/1987 | Akao . |
| 4,663,218 | 5/1987 | Akao . |
| 4,687,692 | 8/1987 | Akao . |
| 4,701,359 | 10/1987 | Akao .................... 428/220 |

FOREIGN PATENT DOCUMENTS 0156203  3/1985  European Pat. Off. .
2026942  7/1987  United Kingdom .

Primary Examiner—George F. Lesmes
Assistant Examiner—J. B. Monroe
Attorney, Agent, or Firm—Burns, Doane, Swecker & Mathis

[57] ABSTRACT

A packaging material which comprises a simultaneously coextruded film comprising a conductive ethylene-ethyl acrylate copolymer resin layer containing more than 50 wt.% of ethylene-ethyl acrylate copolymer resin of which content of ethyl acrylate is more than 6 wt.%, 7 to 20 wt.% of carbon black and 0.01 to 1 wt.% of a lubricant, and a polyolefin resin layer.

The packaging material of the invention is superior in antistatic property, moistureproofness, light-shielding, tear strength, impact puncture strength, slipping character and heat sealing properties. Its production is easy because of superior moldability, and generations of blocking, fish eye and pin hole are rare. The packaging material of the invention can be made thinner than the conventional packaging material, and expensive metal foil is not necessary. Accordingly, this packaging material is inexpensive.

14 Claims, 2 Drawing Sheets

PACKAGING MATERIAL

BACKGROUND OF THE INVENTION

1. Field of the Invention

This invention relates to a packaging material suitable for various photographic or other photosensitive materials or other products such as IC, of which function is damaged by static electricity.

2. Description of the Prior Arts

Generally, plastic film is electrical insulation, and static electricity is accumulated by contact, friction or peeling with various materials through its manufacture and use. This accumulated static electricity gives rise to various troubles, such as adhesion of dust, strong electric shock, electric discharge to cause sparking or ignition on an inflammable material. The trace of electric discharge (static mark) is a fatal defect for photographic photosensitive materials such as photographic film and photographic printing paper. In the case of IC, its function is also damaged by static electricity.

Accordingly, antistatic property is strictly required for the packaging materials for these materials or products. Other properties are also required according to their uses. For example, as the packaging materials for photographic photosensitive materials, it is necessary that various properties such as light-shielding, gas barrier, moisture proofing, physical strengths such as breaking strength, tear strength, impact puncture strength, Gelbo test strength and wear resistance, heat sealing properties such as heat seal strength, hot tack properties (hot-seal ability), and seal ability of contraries, bag-making aptitude, slipping character and the like in addition to antistatic property be achieved. Generally, it is difficult to satisfy these properties by a single film material. Therefore, a composite laminated film of a high-pressure branched low-density polyethylene (LDPE) kneaded with carbon black and flexible sheet(s) such as bleached kraft paper and aluminum foil has been employed. A representative example of the conventional laminated film is composed of a light-shielding LDPE film layer, a light-shielding metal foil layer laminated on it through an adhesive layer, and a flexible sheet layer laminated thereupon through an adhesive layer.

On the other hand, the present inventor has already disclosed a laminated film for photosensitive materials of which physical strength was raised by combining two uniaxially stretched films (U.S. Pat. No. 4,331,725). Another laminated film for photosensitive materials has also been disclosed. This film is composed of a foamed sheet layer and two uniaxially stretched thermoplastic resin film layers having a light-shielding property and laminated on both faces of the foamed sheet layer directly or through an adhesive layer. The thickness of the foamed sheet layer is in the range of 0.3 to 2.0 mm, and the expansion ratio is 5 to 50 times. Two uniaxially stretched films are located so that their stretched axes cross each other at an angle of more than 30 degrees, and the laminated film is compressed up to 40 to 85%, of the theoretical total thickness. Impact puncture strength and Gelbo test strength of the compressed laminated film is large, and curling hardly occurs. This film is suitable for a weight material (U.S. Pat. No. 4,565,733).

Though the above laminated films were made in order to improve the foregoing physical properties, since aluminum foil is employed in order to secure antistatic property and moisture proofing, physical properties of these conventional films were still not enough. During packaging, the films were sometimes torn or made a hole occurred or heat sealing of the films was sometimes failed, particularly in the cases of weight products and roll films having a sharp edge. In addition, when a large amount of a light-shielding material such as carbon black was added, physical strength of the film was lowered. Then, the amount was set about 3%, and the total thickness of the film was more than 70 μm. As a result, the film was stiff, and working efficiency of the packaging process was badly influenced. The cost of the packaging was also expensive. In the case of the laminated film having 7 layers used for photographic color printing paper, since aluminum foil was employed in order to secure moisture proofing and antistatic property, tear strength, impact puncture strength, Gelbo test strength, etc. were not enough. In the case of the laminated film disclosed in the spciification of U.S. Pat. No. 4,331,725, since two layers of uniaxially stretched film were necessary, the laminated film was thick and expensive as the packaging material, though physical properties such as tear strength were improved. In the case of the laminated film disclosed in U.S. Pat. No. 4,565,733, the laminated film was thick and its heat sealing properties were not good in order to secure light-shielding and moisture proofing. Furthermore, since the bag-making aptitude was also not good, the bag for packaging photosensitive materials was formed by using a heat sealer having a special cooling device, and a hot bar was pressed through a heat-resistant film. As a result of these, the laminated film of U.S. Pat. No. 4,565,733 was expensive. When metal foil is not employed, physical strength is raised, but the antistatic property and moisture proofing decrease.

SUMMARY OF THE INVENTION

An object of the invention is to provide a packaging material which is superior in antistatic property.

Another object of the invention is to provide a packaging material which has a sufficient moistureproofness, light-shielding and physical strength.

Still another object of the invention is to provide a packaging material which can be made thin and of which production is easy.

The present invention is to provide a packaging material which has achieved these objects. Such a packaging material comprises a simultaneously coextruded film comprising a conductive ethylene-ethyl acrylate copolymer resin layer containing more than 50 wt. % of ethylene-ethyl acrylate copolymer resin of which the content of ethyl acrylate is more than 6 wt. %, 7 to 20 wt. % of carbon black and 0.01 to 1 wt. % of a lubricant, and a polyolefin resin layer.

Figure 1:
FIGS. 1 to 6 are partially sectional views of preferred embodiments of the invention.

The ethylene-ethyl acrylate copolymer (EEA) resin is a theromplastic resin being more flexible, and thermostable and having a lower crystallization temperature than polyethylene resin. Carbon black receptivity of the EEA resin is large compared to high-pressure branched low-density polyethylene (LDPE) resin. When the carbon black content is high, such as 7 to 20 wt. % where the antistatic property can be secured, the physical strengths and heat sealing properties are not so decreased, and electrical conductivity is acceptible. The ethyl acrylate content of EEA resin is more than 6 wt. %, usually 6 to 50 wt. %, preferably 15 to 30 wt. %. When the ethyl acrylate content is less than 6 wt. %, carbon black receptivity is small, and its uniform dispersion becomes difficult. Physical strength appreciably decreases, and the antistatic effect becomes insufficient. The content of the EEA resin in the conductive EEA resin layer is more than 50 wt. %. When its content is less than 50 wt. %, the results are similar to the above case when the ethyl acrylate content is less than 6 wt. %. The EEA resin is readily miscible with various polyolefin resins such as high-density polyethylene (HDPE) resin, LDPE resin, linear low-density polyethylene (L-LDPE) resin and various polypropylene (PP) resins. The EEA resin is manufactured by UNION CARBIDE, NIPPON UNICAR CO., LTD., MITSUBISHI PETROCHEMICAL CO., LTD., SUMITOMO CHEMICAL CO., LTD., MITSUI POLYCHEMICALS CO., LTD., etc.

The carbon black is added in order to impart light-shielding and antistatic property, and its content is 7 to 20 wt. %. When the content is less than 7 wt. %, the antistatic property becomes insufficient. While, when the content is beyond 20 wt. %, the characteristic of antistatic property becomes a problem. Besides, physical strength, moldability, moisture proofness and the like are also problems.

Necessary antistatic property which makes surface resistance less than $10^{10}\Omega$ may not be endowed by carbon black alone. In this case, it is necessary to use conductive carbon black. Examples of the conductive carbon black are acetylene carbon black and Ketschen carbon black which is a modified by-product carbon black.

The antistatic property may be secured by blending a conductive material in addtion to carbon black. Examples of the conductive material are various conductive metal particles, antistatic agents (for example, enumerated in "Taiden Boshi Zai" (Hideo Marumo, published by Saiwa Shobo, Japan)), and the metal powder, the fibrous conductive filler or other fillers hardened by using a liquid polymer or an organic solvent-soluble polymer. In this case, the carbon black having a pH of 5 to 9 and a mean particle size 10 to 120 μm is preferable. Particularly, oil furnace carbon black having a pH of 6 to 8 and a mean particle size of 15 to 30 μm is preferable because of dispersibility and light-shielding ability. By using the carbon black of such a pH and particle size, a packaging material suitable for photographic photosensitive materials and having the following merits is obtained. That is, the occurrence of fogging is rare, increase or decrease of photosensitivity rarely occurs, light-shielding ability is large, and the lumps of carbon black and pinholes such as fish eyes are hardly generated.

As the method of blending carbon black with the EEA resin, powder blending method, paste blending method, wet blending method, compound coloring method, masterbatch method, etc. may be employed. Among them, the masterbatch method is preferable in points of cost and process. Various masterbatch methods are known, and any known method may be employed. Such a masterbatch method includes the method of dispersing carbon black into a polymer organic solvent solution to produce a masterbatch (Japanese Patent KOKOKU No. 40-26196) and the method of dispersing carbon black into polyethylene to produce a masterbatch (Japanese Patent KOKOKU No. 43-10362).

In this method, first, a masterbatch is prepared by blending more than 10 wt. %, usually more than 30 wt. %, of carbon black with a polyolefin, preferably LDPE, L-LDPE, ethylene-vinyl acetate copolymer (EVA), EEA, ethylenemethacrylate copolymer (EMA) or the like. Ethyl acrylate content of the above EEA resin may be more or less than 6 wt. %. That is, a part of the EEA base resin may be used as the resin for the masterbatch. Then, the EEA base resin is blended with this masterbatch so that the carbon black content becomes 7 to 20 wt. %. As the resin for the masterbatch, a polyolefin resin of which MI is higher than the EEA base resin is preferable because the carbon black particles uniformly disperse.

While, in view of uniform dispersion of carbon black, compound coloring method is the most superior, though it is expensive.

The lubricant is blended in order to improve insertion of the product to be packaged, antiblocking ability, film moldability, antistatic electrification ability at releasing and the like. Suitable content of the lubricant is 0.01 to 1 wt. % which is determined by securing the above properties while avoiding the adverse influence of excess lubricant. When the content is beyond the suitable range, surface of the packaging material becomes sticky and dusts adhere on it. In the case that the product is a photographic photosensitive material, excess lubricant badly influences upon it, and development troubles happen. In terms of the influence on photosensitive materials and improvement of the foregoing properties including slipping character, silicone lubricants, fatty acid amide lubricants, fatty acid lubrications and alkylamine lubricants are preferable. The silicone lubricants include dimethylpolysiloxane. The fatty acid amide lubricants have a carbon number of 10 to 50, preferably 15 to 35, and it includes an alkylene bis fatty acid amide. Examples of such a fatty acid amide are oleic acid amide, erucic acid amide and stearic acid amide. Carbon number of the fatty acids is in the same range as the above case of the fatty acid amides.

Examples of commerical lubricants suitable for the present invention include;

Silicone lubricants; "SHINETSU SILICONE" (Shinetsu Chemical Co., Ltd.), "TORAY SILICONE" (Toray Silicone Co., Ltd.)

Oleic acid amide lubricants; "ARMOSLIP-CP" (Lion Akzo Co., Ltd.), "NEWTRON" and "NEWTRON E 18" (Nippon Fine Chemical Co., Ltd.), "AMIDE-0" (Nitto Kagaku K. K.), "DIAMID 0-200" and "DIAMID G-200" (Nippon Kasei Chemical Co., Ltd.)

Erucic acid amide lubricants; "ALFLOW P-10" (Nippon Oil and Fats Co., Ltd.)

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.)

Bis fatty acid amide lubricants; "BISAMIDE" (Nitto Kaguku K. K.), "DIAMID-200 BIS" (Nippon Kasei Chemical Co., Ltd..), "ARMOWAX-EBS" (Lion Akzo Co., Ltd.)

Alkylamine lubricants; "ELECTROSTRIPPER TS-2" (Kao Corp.)

The conductive EEA resin layer may contain other components. For example, less than 40 wt. % of other polyolefin resin(s) may be blended in addition to EEA resin. Such a polyolefin resin includes HDPE resin, LDPE resin, L-LDPE resin, and various PP resins.

The conductive EEA resin layer is endowed with electrical conductivity mainly by blending carbon black or other conductive material in a high content. However, the EEA resin itself is also conductive, and some lubricants contribute to the conductivity, the conductivity of this layer is to make the surface resistance less than $10^{10}\Omega$.

The thickness of the conductive EEA layer is usually 10–160 μm, particularly 15–100 μm.

Polyolefin resins usable for the polyolefin resin layer include LDPE resin, medium-density polyethylene (MDPE) resin, HDPE resin, L-LDPE resin, ethylene-propylene copolymer resin (random type or block type), ethylene(butene-1) copolymer resin, propylene-(butene-1) copolymer resin, poly(butene-1) resin, polystyrene resin, poly(methyl methacrylate) resin, styrene-acrylonitrile copolymer resin, ABS resin, PP resin, crystalline propylene-α-olefin copolymer resin, modified polypropylene resin, modified polyethylene resin, polypropylene-maleic anhydride graft copolymer resin, chlorinated polyolefin resin such as chlorinated polyethylene resin, chlorinated HDPE resin, chlorinated LDPE resin, chlorinated polyethylene copolymer resin and chlorinated atactic PP resin, EVA resin, ethylene ionomer resin (copolymer of ethylene and unsaturated acid is crosslinked by metal ion), poly(4-methylpentene-1) resin, ethylene-acrylic acid copolymer (EAA) resin, EMA resin, vinyl chloride-propylene resin, ethylene-vinyl alcohol copolymer resin, crosslinked polyethylene resin (electron ray irradiation crosslinking, chemical crosslinking, etc.), polyisobutylene resin, ethylene-vinyl chloride copolymer resin and poly(1,2-butadiene) resin.

Among the above enumerated polyolefin resins, L-LDPE resin is the most preferable. The L-LDPE is a copolymer of ethylene and a-olefin, and it has a linear structure having short branches. The carbon number of the α-olefin is 3–13, preferably 4–10, and examples are butene-1, 4-methylpentene-1, hexene-1, heptene-1 and octene-1. Preferably α-olefins are 4-methylpentene-1, hexene-1 and octene-1. Suitable ethylene content of L-LDPE is 86–99.5 mol. %, i.e. a-olefin content is 0.5–14 mol. %, and preferable ethylene content is 90–99.5 mol. %, i.e. a-olefin content is 0.5–10 mol. %. Suitable density is in the range of 0.87–0.94 g/cm$^3$, preferably 0.930–0.945 g/cm$^3$ (ASTM D-1505). Melt index (M.I., at 190° C.) is preferably 0.4–30 g/10 minutes (ASTM D-1238). Such a L-LDPE resin is manufactured by vapor phase or liquid phase low- or medium-pressure method or modified high-pressure method. Examples of L-LDPE resin are "UNIPOLE" and "TUFLIN" (trade name, UCC), "DOWLEX" (trade name, Dow Chemical Co., Ltd.), "STAMILEX" (trade name, DSM), "SUCLEAR" (trade name, DuPont de Nemour, Canada), "MARLEX" (trade name, Phillips Co., Ltd.), "ULTZEX" and "NEOZEX" (trade names, Mitsui Petroleum Chemical Industries Co., Ltd.), "NISSEKI LINIREX" (trade name, Nippon Petrochemicals Co., Ltd.), "IDEMITSU POLYETHYLENE-L" (Idemitsu Petrochemical Co., Ltd.) and "NUC POLYETHYLENE-LL" (trade names, Nippon Unicar Co., Ltd.).

The L-LDPE resin may be used alone or mixed with thermoplastic resin(s). However, even in the latter case, the content of L-LDPE is preferably more than 50 wt. % in order to secure its superior properties such as physical strengths including tear strength and impact puncture strength and heat sealing properties such as heat seal strength, hot tack properties and sealability. As the thermoplastic resin mixed with L-LDPE resin, a polyolefin resin, particularly LDPE resin, EVA resin and EEA resin are preferable in view of improving inflation film moldability without substantial lowering of physical strength.

In order to secure light-shielding, a light-shielding material is preferably added to the polyolefin resin. This light-shielding material may be a light-reflective material or a light-absorptive material.

The light-reflective material is preferably conductive, and includes metal powder, metal flake and metal fiber. White pigment is also usable. Preferable metal powder is aluminum powder or the aluminum from which low volatile components are removed. The aluminum powder is manufactured by atomization, powdering, dropping on a rotary disc or evaporation from melted alumium. Since aluminum powder is unstable, it is stabilized by a known treatment. Production of the metal powder for blending with plastics is disclosed, for example, in Japanese Patent KOKAI No. 59-75931. The paste of aluminum powder is produced by adding mineral spirit and a small amount of a higher fatty acid such as stearic acid or oleic acid to form paste at the production of aluminum powder according to a known method such as using a ball mill, a stamp mill or an atomizer. A polyolefin thermoplastic resin such as various polypropylene resins, various polyethylene resins, EVA resin, EEA resin and EAA resin is kneaded together with this aluminum paste under heating, and volatile components mainly mineral spirit are removed by a vacuum pump. This product is used as aluminum paste compound resin or aluminum paste masterbatch resin. The aluminum paste masterbatch resin is preferable because of eliminating bad smell and bad influence upon the photographic photosensitive materials by minimizing the content of mineral spirit in the coextruded film such as less than 0.1% by weight. The metal flake and the metal fiber includes aluminum flake and aluminum fiber. Examples of the white pigment are titanium oxide and barium sulfate. Among them, aluminum powder including paste is the most preferable.

Instead of the light-reflective material, a light-absorptive material such as carbon black or other light-absorptive pigment or dye may be blended. When such a light-shielding material is not blended, the polyolefin layer may be transparent. However, blending of a light-reflective material is preferable in view of heat shielding in the sunshine and its appearance.

The thickness of the polyolefin resin layer is usually 10–160 μm, particularly 15–100 μm.

The coextruded film may contain one or more layers in addition to the conductive EEA resin layer and the polyolefin resin layer.

Coextrusion may be carried out according to a known method such as T die extrusion or the inflation process. The thickness of the coextruded film is determined so as to secure light-shielding, moistureproofness and physical strengths, and it is usually 30 to 200 μm. In the case of thinner than 30 um, it becomes difficult to secure moistureproofness, waterproofness, physical strengths, dropping strength and the like. While, in the case of thickness greater than 200 μm, troubles happen in molding such as the generation on a rough texture and a increase in the load of the motor of extruder. The cost of the film also becomes expensive.

The packaging material of the invention may be composed of the coextruded film alone, or other flexible sheet(s) may be laminated thereon. When an other flexible sheet is laminated, the thickness of the coextruded can be made 10% or more thinner than the case of the coextruded film alone. The flexible sheet capable of laminating on the coextruded film includes various unstretched, uniaxially stretched or biaxially stretched thermoplastic resin films such as various polyethylene films, ethylene copolymer films, polypropylene films, polyvinyl chloride films, polyvinylidene chloride films, polyamide films, polycarbonate films, polyester films and their modified resin films. Various flexible sheets such as a metallized film including aluminum-metallized film, aluminum-metallized paper, cellulose acetate film, cellophane, polyvinyl alcohol film, various papers, metal foil such as aluminum foil, non-woven fabric, cross laminated porous fabric, a porous film, foamed polyethylene sheet, foamed polypropylene sheet, foamed polystyrene sheet and foamed polyurethane sheet are also suitable.

When the packaging material is a composite film, the conductive EEA resin layer of the coextruded film is preferably located as the inner face layer to touch the product to be packaged.

Flexible sheet layers may be laminated according to any known method, however, dry laminating and extrusion laminating are particularly favorable. The adhesive suitable for the extrusion laminating method includes various polyolefin resins such as polyethylene resin, polypropylene resin, polybutylene resin and ethylene copolymer resins including EVA resin, EMA resin, EEA resin and L-LDPE resin, and ionomer resins ("SURLYN" DuPont, "HIMIRAN" Mitsui Polychemical Co., Ltd., etc.). The melting point of the adhesive employed is preferably 5° C. lower than the melting point of the flexible sheet in order to laminate without bad influence upon the flexible sheet by a thermal melting adhesion.

The thickness of the adhesive layer formed by extrusion laminating using a thermoplastic resin is usually 60 to 50 μm, preferably 10 to 20 μm. However, the thickness is determined based upon cost, rate of application, the thickness of all the layers, and the like, and accordingly, the thickness is not limited to the above range.

Representative embodiments of the packaging material of the invention are illustrated in FIGS. 1 to 6.

The packaging material of FIG. 1 is the most fundamental packaging material of the invention which is a simultaneously coextruded double layer film 3 consisting of a conductive EEA resin layer 1 containing more than 50 wt. % of EEA resin of which the content of ethyl acrylate is more than 6 wt. %, 7 to 10 wt. % of carbon black and 0.01 to 1 wt. % of a lubricant and a light-shielding polyolefin resin layer 2a containing a light-shielding material.

Figure 2:
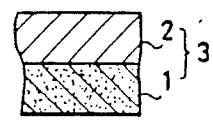

The packaging material of FIG. 2 is also a simultaneously coextruded double layer film 3 consisting of a conductive EEA resin layer 1 and a polyolefin resin layer 2 not containing a light-shielding material.

Figure 3:
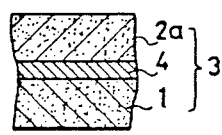

The packaging material of FIG. 3 is a simultaneously coextruded triple layer film 3 consisting of a conductive EEA resin layer 1, a light-shielding polyolefin resin layer 2a and an intermediate layer provided between them.

Figure 4:
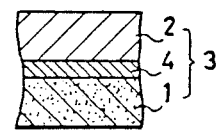

The packaging material of FIG. 4 is a simultaneously coextruded triple layer film 3 consisting of a conductive EEA resin layer 1, a polyolefin resin layer 2 not containing a light-shielding material and an intermediate layer provided between them.

Figure 5:
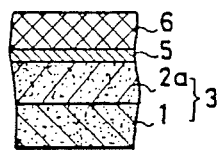

The packaging material of FIG. 5 is a composite film consisting of the simultaneously coextruded double layer film 3 of FIG. 1 and a flexible sheet layer 6 laminated thereon through an adhesive layer 5.

Figure 6:
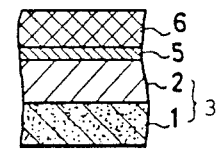

The packaging material of FIG. 6 is a composite film consisting of the simultaneously coextruded double layer film 3 of FIG. 2 and a flexible sheet layer 6 laminated thereon through an adhesive layer 5.

Figure 7:
FIG. 7 is a partially sectional view of a comparative packaging material.

The packaging material of FIG. 7 is a comparative packaging material consisting of a conductive EEA resin single layer 1 film.

Figure 8:
FIGS. 8 and 9 are partially sectional views of conventional packaging materials.

The packaging material of FIG. 8 is a most fundamental conventional packaging material consisting of a light-shielding LDPE resin single layer 8 film.

Figure 9:
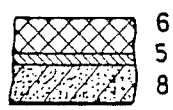

The packaging material of FIG. 9 is a conventional packaging material consisting of a light-shielding LDPE resin layer 8 of FIG. 8 and a flexible sheet layer 6 laminated thereon through an adhesive layer 5.

The packaging material of the invention is suitable for not only the products requiring moistureproofness, light-shielding and antistatic property such as photographic photosensitive materials, other photosensitive materials and thermosensitive recording materials but also the products particularly requiring moistureproofness and antistatic property such as IC. The photographic photosensitive materials are silver halide photographic photosensitive materials, diazo photographic photosensitive materials, photosensitive resins, self-developing type photographic materials, diffusion-transfer type photographic materials and the like. The other photosensitive materials include any material discolored, or denatured by light. Examples of such a photosensitive material are foods are drinks such as chocolate, margarine, Miso, wine and beer, medicines, dyes and other chemical materials such as developing solution and mordants for dyeing. However, the packaging material of the invention is particularly suitable for photographic photosensitive materials.

The package form may be conventional, and includes a single-sheet flat bag, a double-sheet flat bag, a square bottom bag, a self-standing bag, a single-sheet gusset bag, a double-sheet gusset bag, a film sheet, inner lining for a moisture proof box and a leader paper. The sealing form may also be conventional, and includes heat sealing, impulse heat sealing, supersonic welding and high frequency sealing. The methods of using an adhesive and a pressure sensitive adhesive may also be utilized.

The packaging material of the invention is superior in antistatic property, moistureproofness, light-shielding, tear strength, impact puncture strength, slipping character and heat sealing properties. Its production is convenient because of superior moldability, and the generations of blocking, fish eyes and pinhole are rare. The packaging material of the invention can be made thinner than the conventional packaging material, and expensive metal foil is not necessary. Accordingly, this packaging material is inexpensive.

EXAMPLES

The packaging material of Example 1 corresponds to the embodiment illustrated in FIG. 1. The conductive EEA resin layer is 50 μm thick, and consists of EEA resin ("NUC-6170", NIPPON UNICAR CO., LTD.) containing 15 wt. % of Ketschen carbon black (LION AKZO CO., LTD.) and 0.05 wt. % of erucic acid amide lubricant ("ALFLOW P-10", NIPPN OIL AND FATS CO., LTD.). Ethyl acrylate (EA) content of the EEA resin is 18 wt. %, its MI is 6 g/10 minutes, and its density is 0.93 g/cm$^3$. The polyolefin resin layer is also 50 μm thick, and formed 98 wt. % of polyolefin resin consisting of 95.5 parts by weight of L-LDPE resin ("ULTZEX 2020L", MITSUI PETROCHEMICAL INDUSTRIES CO., LTD.) which is a copolymer of ethylene and 4-methylpentene-1 and 4.5 parts by weight of LDPE resin and 2 wt. % of aluminum powder. This resin for extrusion of the polyolefin resin layer was produced by first making an aluminum paste masterbatch of the LDPE resin so that final content of low volatile components in the polyolefin resin layer became lower than 0.05 wt. %, and then blending this masterbatch with the L-LDPE resin. Coextrusion was carried out by inflation process.

The packaging material of Example 2 is the same as Example 1 except that the conductive EEA resin layer further contains 30 wt. % of L-LDPE resin "ULTZEX 2020L".

Comparative packaging material is a light-shielding single layer film consisting of the conductive EEA resin layer having the same composition as Example 1 and 100 μm thick. It was also produced by inflation process.

The conventional packaging material corresponds to FIG. 8. It is a light-shielding single layer film consisting of a light-shielding LDPE resin layer containing 3 wt. % of oil furnace carbon black.

In the above packaging materials, the LDPE resin is "DFD-0111" (NIPPON UNICAR CO., LTD., MI; 2.4 g/10 minutes, Density; 0.923 g/cm$^3$), and the carbon black is "#44B OIL FURNACE CARBON BLACK" (MITSUBISHI CHEMICAL INDUSTRIES LTD., Mean particle size; 21 mμ, pH; 7.7).

Constitutions of the above packaging materials are tabulated in Table 1, and their properties are tabulated in Table 2.

TABLE 1

| | Unit | Invention 1 | Invention 2 | Comparative | Conventional | Test Method |
|---|---|---|---|---|---|---|
| Conductive EEA Resin Layer | | | | | | |
| EA Content | wt. % | 18 | 18 | 18 | — | NUC Method |
| Carbon Black | — | Ketschen | " | " | — | — |
| Carbon Black Content | wt. % | 15 | 15 | 15 | — | — |
| Others | — | — | L-LDPE | — | — | — |
| Others Content | wt. % | — | 30 | — | — | — |
| Thickness | μm | 50 | 50 | 100 | — | JIS P-8118 |
| Polyolefin Resin Layer | | | | | | |
| Polyolefin | — | L-LDPE 95.5% LDPE 4.5% | " | — | LDPE | — |
| Light-Shielding Material | — | Al Paste | " | — | Oil Furnace Carbon Black | — |
| Light-Shielding Content Material | wt. % | 2 | 2 | — | 3 | — |
| Thickness | μm | 50 | 50 | — | 100 | JIS P-8118 |
| Total Thickness | μm | 100 | 100 | 100 | 100 | JIS P-8118 |
| Blow-up Ratio | — | 2.0 | 2.0 | 2.0 | 2.0 | — |

TABLE 2

| | Unit | Invention 1 | Invention 2 | Comparative | Conventional | Test Method |
|---|---|---|---|---|---|---|
| Tensile Strength (MD) | kg/15 mm | 3.21 | 3.73 | 2.30 | 2.68 | JIS P-8113 |
| Tenisle Strength (CD) | " | 3.47 | 4.02 | 2.05 | 2.62 | " |
| Extensibility (MD) | % | 473 | 508 | 205 | 367 | " |
| Extensibility (CD) | " | 512 | 565 | 199 | 622 | " |
| Tear Strength (MD) | g | 1872 | 2146 | 664 | 297 | JIS P-8116 |
| Tear Strength (CD) | " | 2032 | 2338 | 1100 | 683 | " |
| Impact Puncture Strength (1 inch ball) | kg · cm | 22.8 | 25.2 | 15.4 | 12.1 | JIS P-8134 |
| Moisture Permeability | g/m$^2$ 24 h | 3.6 | 3.2 | 5.6 | 3.0 | JIS Z-0208 |
| Bubble Stability | — | B | B | D | B | Inflation Molding Test |
| Surface Resistance at 23° C. | Ω | 1 × 10$^2$ | 2 × 10$^4$ | 1 × 10$^2$ | 2 × 10$^{13}$ | JIS K-6723 |
| Frictional Electrification | V | 0 | −3 | — | −370 | Test A |
| Appearance | — | A | A | D | B | Visual Observation |
| Unevenness in Thickness | — | B | B | E | B | Observation |
| Dimensional Stability in Lay-Flay Width | — | B | A | E | A | " |
| Right-Reverse Judgement in Safety Light (Red) | — | *1 B | *1 B | E | E | |
| Surface Temperature | — | *1 B | *1 B | E | E | 1200000 luxes |

TABLE 2-continued

| | Unit | Invention 1 | Invention 2 | Comparative | Conventional | Test Method |
|---|---|---|---|---|---|---|
| Elevation in the Sunshine | | | | | | 5 hours |

*1 Al face

Evaluations in Table 2 were carried out as follows;

| | |
|---|---|
| A very excellent | B excellent |
| C practical | D having a problem |
| E impractical | |

Test A

An endless belt of each exemplified film having 35 mm in width and 1350 mm in length was prepared, this belt was run between two SUS rollers loaded with 500 g at a speed of 12 m/min. The frictinoal electrification was measured by a voltmeter.

Figure 10:
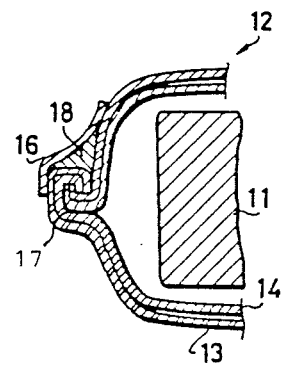
FIG. 10 is a partially sectional view of a photographic photosensitive material packaged in a double-sheet gusset bag.
Figures 11, 12:
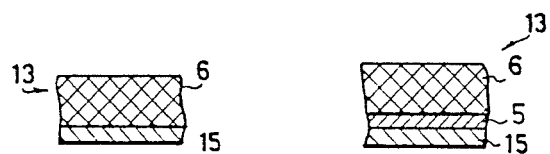
FIGS. 11 and 12 are partially sectional views of outer sheet of a double-sheet gusset bag.

A double-sheet gusset bag for color photographic printing paper was made by using the packaging material of the invention, and illustrated in FIGS. 10 to 12.

FIG. 10 is a partially sectional side view illustrating the state that a roll of color photographic printing paper 11 was packaged in the gusset bag. This bag consisted of an outer sheet 13 and an inner sheet 14. Examples of the outer sheet 13 are shown in FIGS. 11 and 12. The outer sheet 13 of FIG. 11 consisted of a flexible sheet layer 6 and a heat sealing layer 15 laminated thereon. The outer sheet of FIG. 12 consisted of a flexible sheet layer 6 and a heat sealing layer 15 laminated thereon through an adhesive layer 5. On the other hand, the packaging material of the invention such as exemplified in FIGS. 1 or 2 was used as the inner sheet 14. The inner sheet 14 and the outer sheet 13 were sealed at a center sealing of its longitudinal direction (not shown in the drawing) and an edge sealing position 17 by heat sealing. The edge was tacked and joined by an adhesive 18. A tape 16 was further attached to form a seal.

I claim:

1. A packaging material which comprises a simultaneously coextruded film prepared in the absence of a substrate by T die extrusion or by the inflation process and comprising a conductive ethylene-ethyl acrylate copolymer resin layer containing more than 50 wt. % of ethyleneethyl acrylate copolymer resin of which the content of ethyl acrylate is more than 6 wt. %, 7 to 20 wt. % of carbon black and 0.01 to 1 wt. % of a lubricant and having a surface resistance of less than $10^{10}\Omega$ and a polyolefin resin layer.

2. The packaging material of claim 1, on which a flexible sheet is further laminated on the side of said polyolefin resin layer.

3. The packaging material of claim 1, wherein said carbon black is acetylene carbon black or a modified by-product carbon black.

4. The packaging material of claim 1, wherein a conductive material other than carbon black is excluded.

5. The packaging material of claim 1, wherein a conductive material is blended into said conductive ethylene-ethyl acrylate copolymer resin layer.

6. The packaging material of claim 5, wherein said conductive material is selected from the group consisting of conductive metal particles, antistatic agents, a metal powder, a fibrous conductive filler or other filler hardened by using a liquid polymer or an organic solventsoluble polymer.

7. The packaging material of claim 6, wherein said lubricant is selected from the group consisting of silicone lubricants, oleic acid amide lubricants, erucic acid amide lubricants, stearic acid amide lubricants, bis fatty acid amide lubricants and alkylamine lubricants.

8. The packaging material of claim 1, wherein said polyolefin resin is polyethylene resin or a copolymer of ethylene and $\alpha$-olefin.

9. The packaging material of claim 1, wherein said polyolefin resin is L-LDPE resin.

10. The packaging material of claim 1, wherein said polyolefin resin is a mixture of L-LDPE resin with LDPE resin, EVA resin or EEA resin.

11. The packaging material of claim 1, wherein said polyolefin resin layer further contains a light-shielding material.

12. The packaging material of claim 11, wherein said light-shielding material is a light-reflective material.

13. The packaging material of claim 12, wherein said light-reflective material is aluminum powder.

14. In a method of packaging photographic photosensitive materials, the improvement comprising using the packaging material of any one of the preceding claims as said packaging material.

* * * * *